United States Patent [19]

Moore, Jr. et al.

[11] 3,956,171

[45] May 11, 1976

[54] PROCESS FOR PREPARING STABLE POSITIVELY CHARGED ALUMINA COATED SILICA SOLS AND PRODUCT THEREOF

[75] Inventors: Earl P. Moore, Jr., Hockessin; Ginter Vurlicer, Newark, both of Del.

[73] Assignee: E. I. Du Pont de Nemours and Company, Wilmington, Del.

[22] Filed: July 30, 1973

[21] Appl. No.: 383,821

[52] U.S. Cl. .......................... 252/313 S; 106/287 S; 252/317
[51] Int. Cl.² ......................................... B01J 13/00
[58] Field of Search ............... 252/313 S; 106/287 S

[56] References Cited

UNITED STATES PATENTS

| | | | |
|---|---|---|---|
| 2,276,314 | 3/1942 | Kirk | 252/313 S X |
| 2,663,650 | 12/1953 | Iler | 252/313 S X |
| 2,978,349 | 4/1961 | Walsh et al. | 252/313 S X |
| 3,007,878 | 11/1961 | Alexander et al. | 252/313 S |

*Primary Examiner*—Richard D. Lovering

[57] ABSTRACT

Stable sols of positively charged colloidal silica are prepared from a water soluble basic aluminum salt and a negatively charged colloidal silica sol by introducing into the reaction mixture a carbonate, bicarbonate or phosphate salt which is soluble in the reaction mixture or a mixture of any of them.

13 Claims, No Drawings

PROCESS FOR PREPARING STABLE POSITIVELY CHARGED ALUMINA COATED SILICA SOLS AND PRODUCT THEREOF

BACKGROUND OF THE INVENTION

Positively charged coated silica particles as first disclosed in U.S. Pat. No. 3,007,878 by Alexander and Bolt have a variety of properties which make them unique and distinctly different from the previously known negatively charged silica and modified silica sols. However, the commercial exploitation of sols of positively charged silica particles has been limited by stability problems.

Some methods have been proposed by which the stability of sols of positively charged silica particles can be improved. While each method has its advantages, most require several or more steps in order to carry out the stabilization process. For example, in U.S. Pat. No. 3,252,917, Mindick and Thompson disclose a stabilization method which requires a minimum of five steps not including regeneration of the two types of ion exchange resins employed. Such a process is costly and cumbersome as well as time consuming. On the other hand, the process for preparing improved positive sols disclosed in U.S. Pat. No. 3,719,607 to Earl P. Moore is somewhat less costly and time consuming but nevertheless requires at least three different operations, including an aging step which must be conducted until the pH remains constant. While the Moore process yields a distinct improvement in the stability of silica sols, nevertheless it is sufficiently cumbersome and time consuming to render it less than optimally attractive on a commercial basis.

SUMMARY OF THE INVENTION

It has now been found that stable sols of positively charged silica can be prepared from a water soluble basic aluminum salt and negatively charged colloidal silica by introducing into the reaction mixture as a stabilizer a carbonate, bicarbonate or phosphate salt which is soluble in the reaction mixture or any mixture thereof.

The amount of stabilizer is such that from about 0.20 to 0.45 mol of carbonate derived from $CO_2$, bicarbonate or carbonate salt or from about 0.06 to about 0.15 mol of phosphate ion derived from phosphoric acid or phosphate salt is present per mol of $Al_2O_3$ (aluminum ions designated in terms of $Al_2O_3$) in the basic aluminum salt in the reaction mixture. For any mixture of stabilizers which provide both carbonate and phosphate ions, the amounts of each can be calculated as a percentage of the range of either the carbonate or phosphate, as desired, plus 100-X percent of the range of the phosphate or carbonate, respectively, or X% times 0.20 to 0.45 mol of carbonate or 0.06 to 0.15 mol of phosphate plus (100%-X%) of 0.06 to 0.15 mol of phosphate or 0.20 to 0.45 mol of carbonate, respectively.

The carbonate, bicarbonate or phosphate can be introduced into the reaction mixture by first pretreating the colloidal silica with carbon dioxide and/or phosphoric acid and/or a carbonate, bicarbonate or phosphate salt soluble in the reaction mixture. Alternatively, the phosphoric acid, carbonate, bicarbonate or phosphate salt can be introduced into the reaction mixture simultaneously with the colloidal silica sol in such a manner that the pH of the final mixture is from about 4 to about 5.5. In the latter instance, carbon dioxide cannot be used since $CO_2$ is insoluble at a pH of about 5.5. In the former instance, by virtue of the pH of the negatively charged silica sol, the carbon dioxide is substantially converted into bicarbonate ion.

In any case, the pretreatment method which is most preferred is carried out while maintaining the pH of the negatively charged silica sol between about 6.8 to 8.5, preferably between about 7 and 8. The pH can be maintained by additions of acid or alkali or by adjusting the concentration of the stabilizer in the sol or the quantities of the components of any mixture of stabilizers which is used (e.g., acid:salt).

The stabilizers of this invention, other than carbon dioxide, may also be introduced as an individual component into the basic aluminum salt simultaneously with the introduction of the colloidal silica sol as long as the pH of the final reaction mixture is maintained at a level between about 4.0 and about 5.5 and preferably from about 4.5 to about 5.3. If the pH exceeds about 5.5, the viscosity of the sol increases and the sol tends to gel. If the pH of the mixture falls below about 4, the working life of the product is significantly reduced. In any event, the process of this invention provides a simple, efficient and economical mode for achieving a stable sol of positively charged silica particles with no need to post-heat treat, age, cool, post-neutralize and so on.

DETAILED DESCRIPTION OF THE INVENTION

Any suitable silica sol can be used as an initial ingredient including those which are commercially available such as, for example, those sold under the registered trademark "Ludox". Typical processes for preparing this type of silica sol are disclosed for example, in U.S. Pat. No. 2,574,902 issued to Bechtold and Snyder on Nov. 12, 1951; U.S. Pat. No. 2,577,485 issued to Rule on Dec. 4, 1951 and U.S. Pat. No. 2,285,477 issued to White on June 9, 1942. The silica particle size is from about 2 nm up to about 150 nm, preferably 7 to 30 nm and most preferably 10 to 20 nm.

The silica particles which are initially negatively charged are converted to positively charged particles by mixing a sol of the negatively charged particles with a water soluble basic aluminum salt, the most readily available and, hence, preferred of which are the chloride and nitrate. In preparing the positively charged particles, the technique described in U.S. Pat. No. 3,007,878 issued to Alexander and Bolt on Nov. 7, 1961 and in U.S. Pat. No. 3,719,607 issued to Moore on Mar. 6, 1973 can be used.

In the most preferred process of this invention, the negatively charged colloidal silica particles in a sol are pretreated with one or more of the stabilizers of this invention while the pH of the sol is maintained between about 6.8 and about 8.5. On subsequent mixing with the basic aluminum salt, the pH drops to between 4 and 5.5. In another preferred embodiment, any of the stabilizers of this invention except carbon dioxide can be introduced into the basic aluminum salt solution simultaneously with the introduction of the negatively charged colloidal silica sol. Alternatively, the stabilizer or stabilizers may be added even after the sol is mixed into the basic aluminum salt. In either of these latter two cases the pH of the stabilizer should be adjusted to yield a final mixture having a pH of between 4.0 and 5.5.

The basic aluminum chloride or nitrate is usually in the form of an aqueous solution when mixed with the silica sol. Any suitable basic aluminum chloride or nitrate may be employed including, for example, Al$(OH)_2Cl$ to $Al_3(OH)_8Cl$ and $Al(OH)_2NO_3$ to $Al(OH)_8NO_3$. Basic aluminum chlorides are preferred and, of these, $Al_2(OH)_5Cl$ is most preferred.

The amount of the basic aluminum chloride or nitrate to be used is determined by the surface area of the silica particles as described in U.S. Pat. No. 3,007,878. The aluminum to surface silica is usually at a molar ratio of from about 1:2 to 2:1, preferably 1:1.25 to 1.25:1, most preferably 1:1. Surface silica is calculated on the basis of 8 silicon atoms per square nm of silica surface. The fraction of total silica occurring on the surface becomes $8 \times 10^{-4} \times A$ where A is the specific surface area of the colloid in m.$^2$/g. (determined by nitrogen adsorption). In the instant process, the amount of stabilizer employed is determined by the amount of the basic aluminum chloride or nitrate which is employed. When the stabilizer is carbon dioxide or a carbonate or bicarbonate salt, the number of mols of carbonate in the reaction mixture ranges from about 0.20 to about 0.45 mol per mol of $Al_2O_3$ (aluminum expressed as $Al_2O_3$) in the basic aluminum chloride or nitrate, preferably 0.25 to 0.35. When the stabilizer is phosphoric acid or a phosphate, the number of mols of phosphate per mol of $Al_2O_3$ (aluminum expressed as $Al_2O_3$) in the basic aluminum chloride or nitrate ranges from about 0.06 to 0.15, preferably 0.08 to 0.12. When the stabilizer is a mixture which provides both carbonate and phosphate ions, the amount of each component in the mixture can be calculated as a percentage of the range of either the carbonate or phosphate as desired plus 100—$x$ percent of the range of the phosphate or carbonate, respectively or, stated in another way, $x$ (where $x$ is less than 1) times 0.20 to 0.45 mol of carbonate or 0.06 to 0.15 mol of phosphate plus $(1-x)$ times 0.06 to 0.15 mol of phosphate or 0.20 to 0.45 mol of carbonate, respectively.

The additive of this invention may be carbon dioxide, phosphoric acid, any salt of carbonic or phosphoric acid which is soluble in the reaction mixture or mixtures of any of them. Some specific examples of salts which may be used in the practice of this invention include sodium, potassium, lithium, ammonium, quaternary ammonium such as tetramethylammonium and the like soluble bicarbonates, carbonates, dihydrogen phosphates, monohydrogen phosphates, calcium and magnesium bicarbonates and the like and mixtures thereof. It is to be understood that the instant concept includes the use of soluble salts which form by the addition of a free base such as sodium hydroxide or magnesium oxide which react with any acid stabilizer in the reaction mixture to produce such salts.

Because the turbidity of the product depends both on the pH of the negatively charged colloidal silica sol which is introduced into the basic aluminum salt solution and the intensity of agitation upon such addition, with the requirement of the latter being minimized when the pH of the sol is between 7 and 8, the most preferred stabilizer to be used in any particular case may be indicated, at least in part, by the pH of the starting silica sol. For example, if the negatively charged colloidal silica sol is highly alkaline, carbon dioxide and/or a bicarbonate or a somewhat acidic phosphate would be preferred; if the sol is acidic, a carbonate or alkaline phosphate would be preferred.

The salts of the invention are preferably added as water solutions in order to facilitate mixing although they may also be added as a solid if agitation of the reaction mixture is sufficient to rapidly dissolve the solid.

The positively charged silica sols which are prepared directly by this invention are immediately stable even at high conductivities such as, for example, 20,000 to 40,000 micromhos/cm. at 70°F. Positive sols having a high solids content, with solids expressed as $SiO_2$ + $Al_2O_3$ as high as 45 percent, and which have outstanding stability can be prepared directly without a final concentrating step.

The invention is further illustrated but is not intended to be limited by the following examples in which all parts and percentages are by weight unless otherwise specified.

EXAMPLE 1

A silica sol ("Ludox" HS 40) is diluted to a silica content of 33% with water. Carbon dioxide gas is added with mixing until the pH of the diluted sol reaches about 7.0. About 0.51 part of sodium bicarbonate is added per 100 parts of the neutralized sol with moderate mixing until the bicarbonate dissolves. The neutralized, treated sol is added over about 30 minutes to 19.5 parts of a 50% chlorhydrol solution per 100 parts of the sol (approximately 1 $Al^{+3}$ per molecule of surface silica) under high speed turbulent mixing conditions. The sol is allowed to stand until excess carbon dioxide escapes to the atmosphere, facilitated by an air sparge.

The product sol possesses the following properties:
pH — approximately 4.5
Viscosity — less than 10 centipoise
Specific Gravity — 1.230
Turbidity — essentially absent
Color — slight bluish opalescence Chemical Composition:
| | |
|---|---|
| % $SiO_2$ | 25.5 |
| % $Al_2O_3$ | 3.9 |
| % $Cl^-$ | 1.3 |
| % $Na^+$ | 0.40 |

Specific Conductivity — 25,000 micromhos/cm.
Gel Time (at 100°C.) — over 60 hours

EXAMPLE 2

The stability of each sol of this example is measured by partially filling a small test tube with the test sol and heating in stream at 100°C., taking care to prevent loss of water from the sol, until no flow can be observed when the test tube is turned upside down. Sols treated in accordance with this invention exhibit flow for from about 20 hours which is equivalent to a shelf life at room temperature of a minimum of 1 year to over 200 hours. This test can be applied to sols immediately after preparation or several hours later, as convenient.

About 175 parts of silica sol ("Ludox" HS 40) containing 40% silica by weight, the silica particles having a specific surface area of about 210 m.$^2$/g., as determined by nitroen adsorption and containing an amount of stabilizing alkali corresponding to an $SiO_2$:$Na_2O$ ratio of about 95 are mixed in a Waring blender with the additives in the amounts given in the following table. The pH is adjusted in each case to 8.0 by the addition of a 1.5N solution of sodium hydroxide. The resulting mixture is added to 44.6 parts of chlorhydrol (a solution of Al$_2$(OH)$_5$Cl containing 23.5% Al calculated as Al$_2$O$_3$) and sufficient water to yield a total product weight of 271 parts in a Waring blender. The time of addition being 1-2 minutes.

| | Additive | Mols Anion Percent Stabilizer per mol Al$_2$O$_3$ in Basic Al Cpd. | Percent SiO$_2$ | Percent Al$_2$O$_3$ | Gel Time in Steam, Hrs. | Viscosity cps |
|---|---|---|---|---|---|---|
| 1. | CO$_2$ + NaHCO$_3$ | 0.30 | 26 | 3.9 | 80 | 30 |
| 2. | CO$_2$ + NaHCO$_3$ | 0.20 | 26 | 3.9 | 28 | 8 |
| 3. | H$_3$PO$_4$ | 0.11 | 26 | 3.9 | 32 | 20 |
| 4. | H$_3$PO$_4$ | 0.085 | 26 | 3.9 | 30 | 12 |
| 5 | H$_3$PO$_4$ | 0.075 | 26 | 3.9 | 22 | 7 |
| 6. | None | 0.00 | 26 | 3.9 | 7 | 7 |

EXAMPLE 3

Basic aluminum nitrate is prepared from aluminum nitrate and aluminum metal by adding 135 parts of aluminum powder to 375 parts of Al(NO$_3$)$_3$·9H$_2$O in 1 liter of water and heating slowly to 50°C. The mixture thickens and NO$_2$ evolves. When the reaction is completed, sufficient concentrated nitric acid is added to reduce the pH from 4.6 to about 3.7. The solution thins. Analysis reveals that the product contains 11.4% Al$_2$O$_3$ and 8.7% NO$_3$ or Al$_{1.6}$(OH)$_{3.8}$NO$_3$.

To 181 parts of a sol containing colloidal silica having a specific surface of 210 m.$^2$/g. and containing 38.7% SiO$_2$ and having a pH of 8 is added 2.47 parts of NaHCO$_3$ with mixing. The resulting sol which is clear is injected near the blades of a Waring blender and hence under intense agitation to 87.7 parts of basic aluminum nitrate prepared as described above. The resulting product is clear and has a pH of 5.1. The sol has a gel time at 100°C. of about 200 hours and the ratio of aluminum to surface silicon atoms is 1:1.

EXAMPLE 4

A mildly stirred solution of 83.4 parts of "Ludox" AS containing 30% SiO$_2$ and 0.25% NH$_3$ is treated with CO$_2$ gas until the pH of the solution drops from 9.5 to about 7.8. The solution is added over about 10 minutes to an intensely stirred solution of 16.6 parts of chlorhydrol containing 50% Al$_2$(OH$_5$)Cl. A bluish, opalescent solution free of noticeable turbidity having the following properties is otained:

pH — 4.7–4.8
Viscosity — less than 10 cps.
Specific Gravity — 1.225
Gel Time at 100°C. — ~75 hrs.
Specific Conductivity — 40,000 micromhos/cm.

Chemical Composition:
4%          Al$_2$O$_3$
25%         SiO$_2$

EXAMPLE 5

A mildly stirred solution of 61.2 parts of "Ludox" TM containing 49.5% SiO$_2$ having a specific surface area of 135 m.$^2$/g. is diluted with 16.5 parts of water and treated with a carbon dioxide gas sparge until the pH drops from about 9.6 to 7.1 in which case approximately 0.15 part of CO$_2$ reacts with the sodium hydroxide originally present in "Ludox" TM. With continued mild stirring, about 0.457 part of NaHCO$_3$ is added with continued mild stirring to the above solution. After the salt dissolves, the solution is added over about 10 minutes to an intensely stirred solution of 10.6 parts of basic aluminum chloride solution (50% "chlorhydrol") and 11.0 parts of water. A blue-white opalescent solution free of noticeable turbidity which has the following properties is obtained:

pH — 4.9
Viscosity (Brookfield, No. 1 cylindrical spindle at 60 rpm) — < 10 cp.
Specific Gravity — 1.243
Gel Time at 100°C. — ~60 hours
Specific Conductivity — 21,000 micromhos/cm.

EXAMPLE 6

80.5 Parts of a sol of silica having a specific surface area of 210 m.$^2$/gm. and containing 33.1% SiO$_2$ is reacted with carbon dioxide gas to reduce the pH from about 9.6 to 7.0. about 0.30 part of basic magnesium carbonate ("Hydromagnesite") is added with mild mixing. The hydromagnesite remains essentially unreacted. The slurry is added with intense mixing over about four minutes to basic aluminum chloride solution containing 23.5% Al$_2$O$_3$ existing primarily as Al$_2$(OH)$_5$Cl. A somewhat viscous sol which became much more fluid (less than 10 cps.) on aging is obtained. The product pH is about 5.0, the specific gravity is about 1.248, the gel time at 100°C. is greater than 60 hours and the specific conductivity is 23,000 micromhos/cm.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as set forth in the claims.

What is claimed is:
1. In a process for preparing a positively charged alumina coated silica sol by mixing a neutral or alkaline aquasol of colloidal silica particles with an aqueous solution of basic aluminum salt to form a reaction mixture, the improvement which comprises imparting stability to the resulting sol of positively charged silica particles by introducing into the reaction mixture sufficient carbonate, bicarbonate or phosphate stablizer which is soluble in the reaction mixture to yield from about 0.20 to 0.45 mol of carbonate or from about 0.06 to 0.15 mol of phosphate or from about X% of 0.20 to 0.45 mol of carbonate or 0.06 to 0.15 mol of phosphate plus (100%–X%) of 0.06 to 0.15 mol of phosphate or 0.20 to 0.45 mol of carbonate, respectively per mol of Al$_2$O$_3$ in the basic aluminum salt by the addition of a bicarbonate of calcium, magnesium, sodium, potassium, lithium, ammonium or quaternary ammonium; a carbonate, dihydrogen phosphate or monohydrogen phosphate of sodium, potassium, lithium, ammonium or quaternary ammonium; carbon dioxide; phosphoric acid or mixtures thereof.

2. The improvement of claim 1 wherein the stabilizer is introduced by adding a compound selected from the group consisting of phosphoric acid, a carbonate salt, a bicarbonate salt, a phosphate salt and a mixture thereof which is soluble in the reaction mixture as an individual component simultaneous with the addition of the aquasol to the basic aluminum salt while maintaining the pH of the final mixture as from about 4.0 to about 5.5.

3. The improvement of claim 2 wherein the salt is selected from the group consisting of sodium, calcium, magnesium, potassium, lithium, ammonium and tetramethyl ammonium bicarbonate, sodium, potassium, lithium, ammonium and tetramethyl ammonium carbonate, sodium, potassium, lithium, ammonium and tetramethyl ammonium monohydrogen phosphate, and sodium, potassium, lithium, ammonium and tetramethyl ammonium dihydrogen phosphate.

4. The improvement of claim 1 wherein the final pH of the reaction mixture is less than about 5.5.

5. The improvement of claim 4 wherein the pH is between 4.0 and 5.3.

6. The improvement of claim 1 wherein the basic aluminum salt is an aluminum chloride or aluminum nitrate.

7. The improvement of claim 6 wherein the basic aluminum salt is $Al_2(OH)_5Cl$.

8. The product of the process of claim 1.

9. The improvement of claim 1 wherein the stabilizer is introduced into the reaction mixture by mixing the neutral or alkaline aquasol with a compound selected from the group consisting of carbon dioxide, phosphoric acid, a carbonate salt, a bicarbonate salt, a phosphate salt and a mixture thereof which is soluble in the reaction mixture while maintaining the pH of the sol between about 6.8 and 8.5.

10. The improvement of claim 9 wherein the mixture of stabilizers is $CO_2$ and sodium bicarbonate.

11. The improvement of claim 9 wherein the mixture of stabilizers is $CO_2$ and ammonium carbonate.

12. The improvement of claim 9 wherein the mixture of stabilizers is phosphoric acid and sodium phosphate.

13. The improvement of claim 9 wherein the salt is selected from the group consisting of sodium, calcium, magnesium, potassium, lithium, ammonium and tetramethyl ammonium bicarbonate, sodium, potassium, lithium, ammonium and tetramethyl ammonium carbonate, sodium, potassium, lithium, ammonium and tetramethyl ammonium monohydrogen phosphate, and sodium, potassium, lithium, ammonium and tetramethyl ammonium dihydrogen phosphate.

* * * * *

UNITED STATES PATENT OFFICE
CERTIFICATE OF CORRECTION

PATENT NO. : 3,956,171
DATED : MAY 11, 1976
INVENTOR(S) : EARL P. MOORE, JR. and GINTER VURLICER It is certified that error appears in the above-identified patent and that said Letters Patent are hereby corrected as shown below:

Column 3, line 5, "Al(OH)-" should be -- $Al_3(OH)-$ --.

Column 4, line 51, "stream" should be -- steam --.

Column 4, line 62, "nitroen" should be -- nitrogen --.

Column 5, line 47, "otained" should be -- obtained --.

Signed and Sealed this

Thirty-first Day of August 1976

[SEAL]

Attest:

RUTH C. MASON
*Attesting Officer*

C. MARSHALL DANN
*Commissioner of Patents and Trademarks*